(12) United States Patent
Tschida et al.

(10) Patent No.: US 11,283,311 B2
(45) Date of Patent: Mar. 22, 2022

(54) POLYMER-BONDED POSITION SENSOR FOR ELECTRIC MACHINE

(71) Applicant: ABB Schweiz AG, Baden (CH)

(72) Inventors: Colin Tschida, Durham, NC (US); Rajib Mikail, Raleigh, NC (US); Elio Alberto Perigo, Wendell, NC (US)

(73) Assignee: ABB Schweiz AG, Baden (CH)

( * ) Notice: Subject to any disclaimer, the term of this patent is extended or adjusted under 35 U.S.C. 154(b) by 115 days.

(21) Appl. No.: 16/262,544

(22) Filed: Jan. 30, 2019

(65) Prior Publication Data

US 2020/0244114 A1 Jul. 30, 2020

(51) Int. Cl.
| | |
|---|---|
| H02K 1/18 | (2006.01) |
| H02K 15/03 | (2006.01) |
| H02K 29/08 | (2006.01) |
| H01F 1/057 | (2006.01) |
| H01F 1/03 | (2006.01) |

(52) U.S. Cl.
CPC ........... *H02K 1/185* (2013.01); *H01F 1/0315* (2013.01); *H01F 1/057* (2013.01); *H02K 15/03* (2013.01); *H02K 29/08* (2013.01)

(58) Field of Classification Search
CPC ........ H02K 11/21; H02K 29/06; H02K 29/08; H02K 29/14
USPC ........................ 310/66, 68 R, 156.05, 156.06
See application file for complete search history.

(56) References Cited

U.S. PATENT DOCUMENTS

| | | | | |
|---|---|---|---|---|
| 6,680,553 | B1* | 1/2004 | Takano | H02K 3/50 310/156.05 |
| 2009/0275273 | A1* | 11/2009 | Purohit | H02K 7/145 451/357 |
| 2020/0398929 | A1* | 12/2020 | Nishimori | H02K 7/116 |

OTHER PUBLICATIONS

Definition of "bond" retrieved from Dictionary.com, 2021, Dictionary.com.*
Wikipedia page of "plastic", 2021, Wikipedia.*
Elian et al., "Integration of polymer bonded magnets into magnetic sensors," *Electronics System-Integration Technology Conference (ESTC)*, IEEE, pp. 1-5 (2014).
Ferraris et al., "Hybrid magnetic composite (HMC) materials for sensor applications," *Sensors Applications Symposium (SAS)*, IEEE, pp. 1-6 (2016).
U.S. Appl. No. 15/848,649, filed Dec. 20, 2018, Pending.

* cited by examiner

*Primary Examiner* — Quyen P Leung
*Assistant Examiner* — Minki Chang
(74) *Attorney, Agent, or Firm* — Leydig, Voit & Mayer, Ltd.

(57) ABSTRACT

The rotor of a rotor assembly for an electric machine includes first magnetic structures utilized for torque production in the electric machine. Second magnetic structures including second magnetic poles not utilized for torque production in the electric machine are polymer-bonded to at least one of the rotor and the rotor shaft.

18 Claims, 4 Drawing Sheets

POLYMER-BONDED POSITION SENSOR FOR ELECTRIC MACHINE

FIELD OF THE INVENTION

The disclosure relates to rotors of electric motors, and, in particular, electric motors which require the feedback of a rotor position.

BACKGROUND

The manufacture of an electric machine such as a motor or generator involves the assembly of a substantial number of separate components, including, for example, one or more monitoring systems. Such monitoring systems are often utilized to convert the angular position or motion of a shaft to an output signal that may be utilized for speed detection. The components of the motor or generator and the monitoring system are typically manufactured as separate parts.

Monitoring systems commonly include a rotational component that is fitted to the rotating shaft and a stationary position sensor, which senses the position of the rotational component. For example, typical monitoring systems of motors or generators involve installing a part of which must be fitted to the machine's shaft, such as a hall sensor, encoder or resolver; the stationary position sensor is likewise individually mounted to the machine's housing during assembly of the motor or generator. This assembly of the rotational component with the rotating shaft and the stationary position sensor with the housing can be a time-consuming or labor-intensive process in assembly of the motor or generator.

SUMMARY OF THE INVENTION

The disclosure describes in one aspect, a rotor assembly for an electric machine. The rotor assembly includes a rotor shaft, and a rotor secured with the rotor shaft. The rotor includes first magnetic structures utilized for torque production in the electric machine. Second magnetic structures including second magnetic poles not utilized for torque production in the electric machine are formed from polymer-bonded magnets and joined to at least one of the rotor and the rotor shaft.

The disclosure describes in a further aspect, a method of manufacturing a rotor assembly for an electric machine. The method includes providing a rotor and a rotor shaft, providing first magnetic structures on a peripheral surface of the rotor, the first magnetic structures including first magnetic poles and being adapted for torque production in the electric machine, and polymerically bonding second magnetic structures to at least one of the rotor and the rotor shaft, the second magnetic structures including second magnetic poles not utilized for torque production in the electric machine.

The disclosure describes in another aspect, such a method wherein magnetic material is overmolded with a polymeric material to polymerically bond the magnetic material to at least one of the rotor and the rotor shaft.

The disclosure describes in yet another aspect, such a method wherein a polymeric material including magnet materials is molded to at least one of the rotor and the rotor shaft.

In another aspect, the disclosure describes a method wherein one or more polymer-bonded magnet materials are magnetized after being molded to at least one of the rotor or rotor shaft.

DETAILED DESCRIPTION

Figure 1:
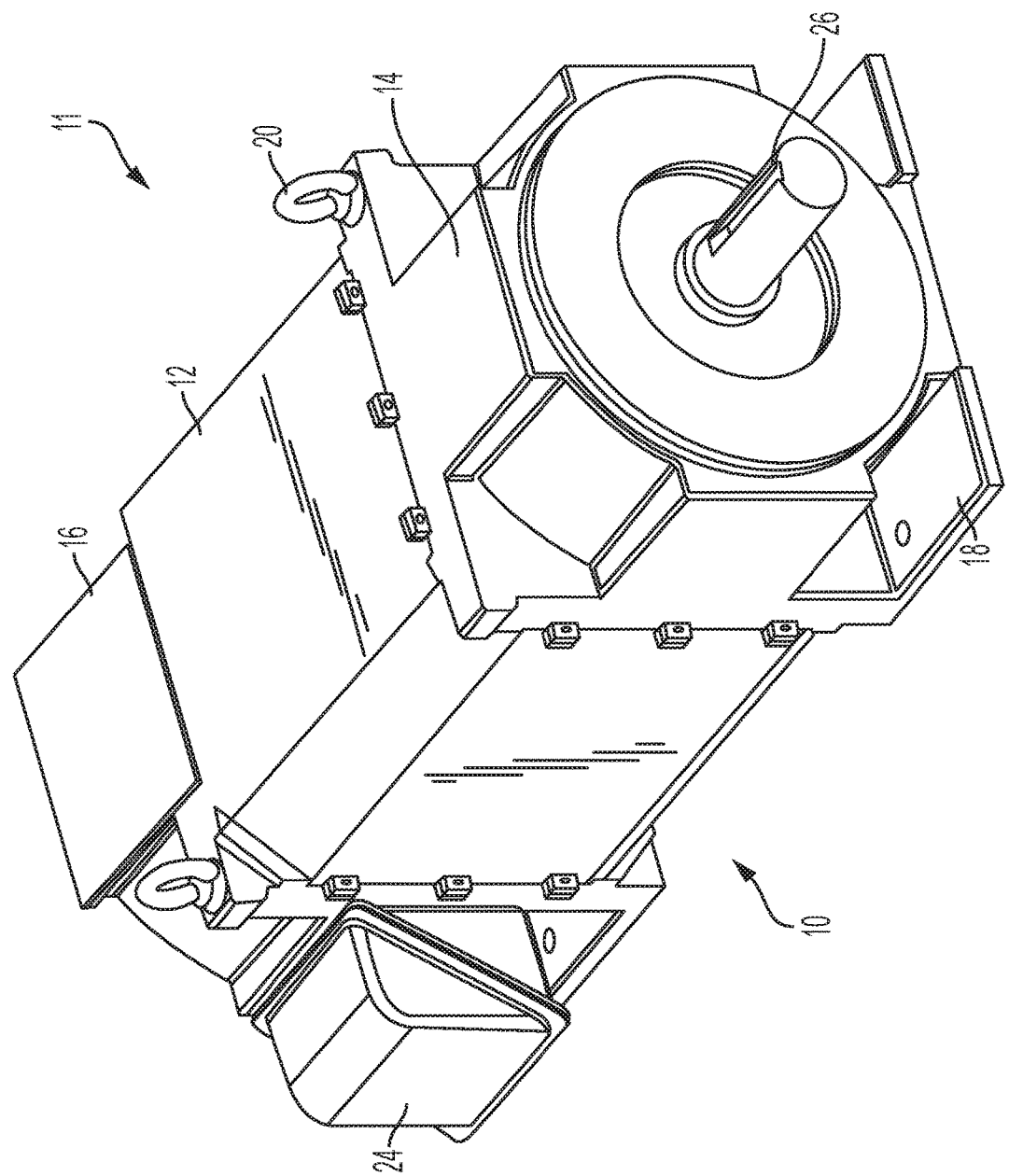
FIG. 1 is an isometric view of an exemplary electric machine in which the techniques and embodiments described herein may be utilized.

Turning to the drawings, FIG. 1 illustrates an exemplary electric machine 10 in which the invention may be utilized. The exemplary electric machine 10 includes a housing 11 having a frame 12 capped at each end by drive and opposite drive end caps 14,16, respectively. The housing 11 may additionally include mounting and transportation features. In the illustrated embodiment, the drive and opposite drive end caps 14,16 include mounting and transportation features, such as the illustrated mounting feet 18 and eyehooks 20. The electric machine 10 may additionally include a conduit box 24, which houses the electrical connection between the terminal leads and the external power source.

Figure 2:
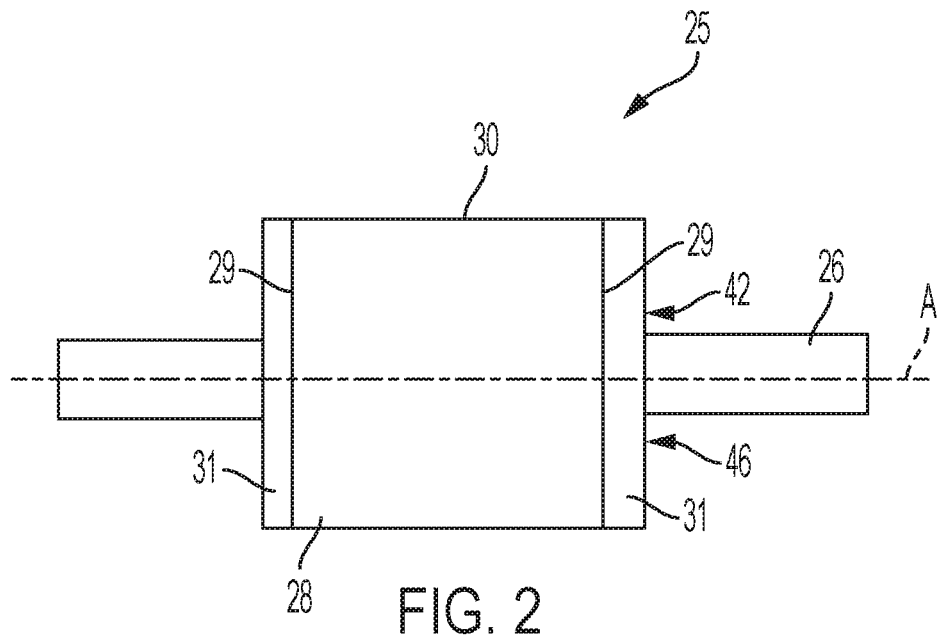
FIG. 2 is a side elevational view of an embodiment of an exemplary rotor assembly incorporating aspects of the invention.

As will be understood by those of skill in the art, the electric machine 10 may include, for example, a stator 22 having a plurality of stator windings (see FIGS. 4-6), as well as a rotatably-mounted rotor assembly 25. Referring to FIG. 2, the rotor assembly 25 includes a rotor 28 and rotor shaft 26 by which the rotor 28 is rotatably mounted within the housing 11, the rotor shaft 26 extending from the housing 11, as schematically illustrated in FIG. 1 for example. The rotor shaft 26 rotates in conjunction with the rotor 28 and may be coupled to any number of drive machine elements, such as pumps, compressors, fans, conveyors, and so forth. The rotor 28 includes an outer peripheral surface 30 and end faces 29 at opposite ends of the rotor 28. The outer peripheral surface 30 of the rotor 28 includes a plurality of first magnetic structures (identified generally as 32). Those of skill in the art will appreciate that the first magnetic structures 32 include first magnetic poles which are utilized for torque production in the electric machine 10 in conjunction with the stator 22.

The electric machine 10 further includes a monitoring system 40 that may be utilized for speed detection, for example. The monitoring system 40 includes a rotational component 42 and a stationary position sensor 44, which senses the position of the rotational component 42. The rotational component 42 includes a plurality of second magnetic structures (identified generally as 46) having second magnetic poles that may be read by an appropriately mounted stationary position sensor 44. The second magnetic structures 46 are not utilized for torque production in the electric machine 10.

In accordance with an aspect of the invention, the rotational component 42 of the monitoring system 40 is polymer-bonded to the rotor assembly 25 with a polymer-based fixation material in a position that may be sensed by the stationary position sensor 44. In illustrated embodiments of the invention, the rotational component 42 is polymer-bonded to the rotor 28 and/or rotor shaft 26.

Figure 3:
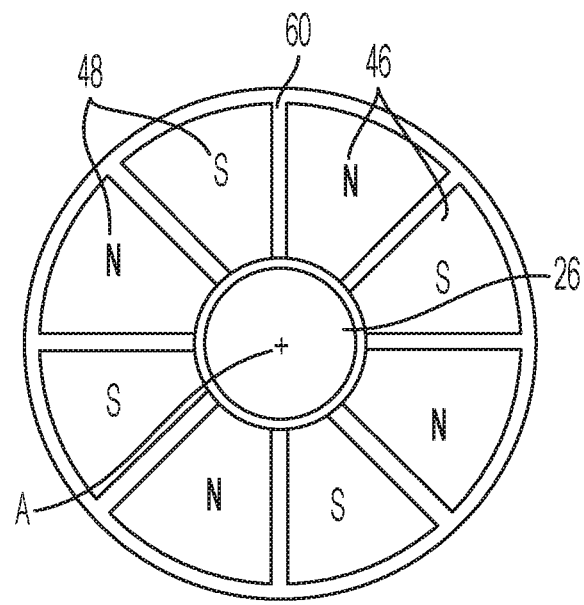
FIG. 3 is an end view of the rotor assembly of FIG. 2.

Referring to FIG. 2, the rotational component 42 may be polymer-bonded at a molded polymeric section that forms an end ring 31 at one or both ends of the rotor 28. In such an arrangement, the plurality of second magnetic structures 46 of the rotational component 42 may include radially-extending alternating polar sections 48. As illustrated in FIG. 3, for example, the plurality of second magnetic structures 46 may include alternating north and south polar sections 48 with second magnetic poles. In this way, an appropriately placed stationary position sensor 44 may sense passing second magnetic structures 46 as the rotor 28 rotates.

While the embodiment illustrated in FIG. 2 includes end faces 29 that extend substantially normal to the axis of the rotor 28 and rotor shaft 26, those of skill in the art will appreciate that the end faces 29 and/or the end rings 31 may extend at other than a normal angle from the axis A. As such, the second magnetic structures 46 may extend at some angle other than normal to the axis of the rotor 28 and rotor shaft 26. Those of skill in the art will appreciate, however, that second magnetic structures 46 disposed at other than normal to the axis A would be axially-extending in addition to being radially-extending, both being envisioned by the invention.

Figure 4:
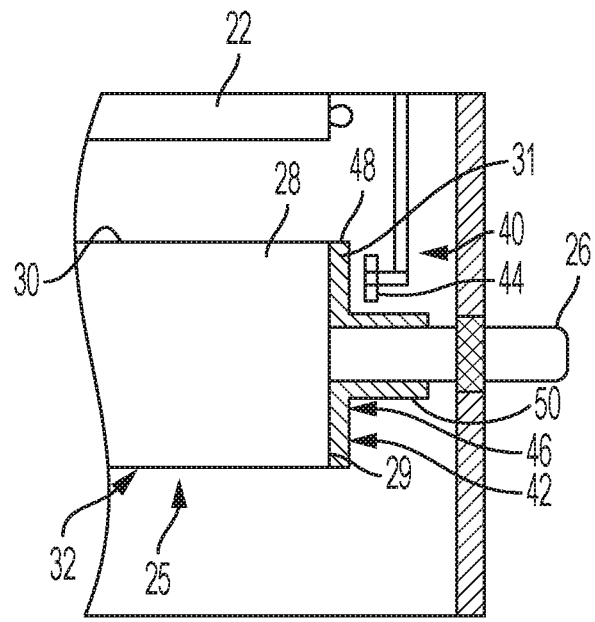
FIG. 4 is a fragmentary, partially cross-sectioned view of an electric machine incorporating an exemplary embodiment of a rotor assembly and monitoring system according to aspects of the invention.
Figure 5:
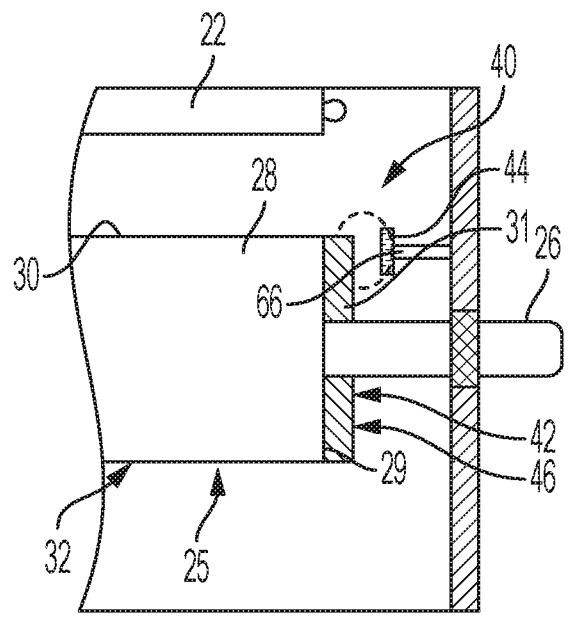
FIG. 5 is a fragmentary, partially cross-sectioned view of an electric machine incorporating an alternate embodiment of a rotor assembly and monitoring system according to aspects of the invention.
Figure 6:
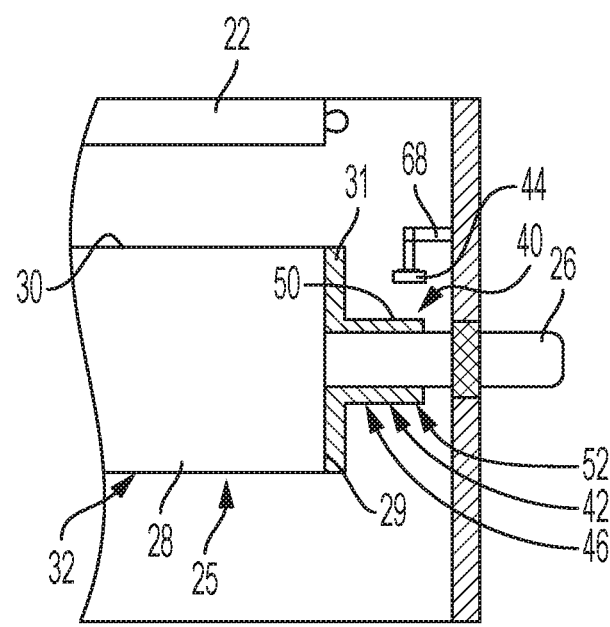
FIG. 6 is a fragmentary, partially cross-sectioned view of an electric machine incorporating another alternate embodiment of a rotor assembly and monitoring system according to aspects of the invention.

Alternatively or additionally, the rotational component 42 may include a molded polymeric section 50 extending axially along the peripheral surface the rotor shaft 26, as illustrated, for example, in FIGS. 4 and 6. That is, the polymer-based fixation material may extend along one or both of the end rings 31, as illustrated in FIGS. 2 and 5, along one or both of the end rings 31 as well as a peripheral surface of the rotor shaft 26, as illustrated in FIGS. 4 and 6, or, as will be understood by those of skill in the art, along only the rotor shaft 26. In the arrangement illustrated in FIG. 4, for example, a molded polymeric section 50 extending axially along the peripheral surface of the rotor shaft 26 may be formed as a sprue utilized in advancing the polymer-based fixation material into a mold. Those of skill in the art will appreciate, however, that a sprue may be presented in an alternative or additional position.

The molded polymeric section 50 may include axially-extending polar sections 52 that alternate about the periphery of the rotor shaft 26. That is, when the rotor shaft 26 is viewed in a radially disposed cross-section, the second magnetic structures 46 may likewise be disposed as illustrated in FIG. 3, but additionally extend axially along the rotor shaft 26.

In an arrangement including a molded polymeric section 50 extending along the rotor shaft 26, either or both of the end rings 31 and the molded polymeric section 50 extending along the rotor shaft 26 may include the second magnetic structures 46. That is, the second magnetic structures 46 may include radially-extending alternating polar sections 48 disposed along an end ring 31 of the rotor 28 (FIG. 4), or axially-extending polar sections 52 disposed along a molded polymeric section 50 extending along the rotor shaft 26 (FIG. 6). Alternatively, the second magnetic structures 46 may include both radially-extending alternating polar sections 48 disposed along an end ring 31 of the rotor 28, as well as axially-extending polar sections 52 disposed along a molded polymeric section 50 extending along the rotor shaft 26 (FIGS. 4 and 6). Further, while FIG. 6 illustrates an arrangement wherein the rotational component 42 includes polymer-based fixation material extending along both an end ring 31 of the rotor 28 and the rotor shaft 26, alternatively, the rotational component 42 may include only axially-extending polar sections 52 disposed along a molded polymeric section 50 extending only along the rotor shaft 26.

In accordance with another aspect of the invention, the rotational component 42 may be polymer-bonded to the rotor 28 and/or the rotor shaft 26 by any appropriate method during or following fabrication of the rotor assembly 25. That is, the second magnetic structures 46 may be bonded to the rotor 28 and/or rotor shaft 26 by a polymer-based fixation material. The material can be of liquid, powder or a state and combination of different states based on the system temperature used in the process. As will be understood by those of skill in the art, the entirety or a portion of at least one of the rotor 28 and rotor shaft 26 may be positioned within a mold and the polymer-based fixation material introduced into the mold by any appropriate process, such as, for example, injection or compression molding. Moreover, the polymer-based fixation material may be introduced to the mold in single or multiple shots.

In some embodiments, permanent magnets may be coupled to or disposed on the rotor 28 and/or rotor shaft 26, and overmolded with the polymer-based fixation material. Referring to FIG. 3, for example, the second magnetic structures 46, 52 in the form of permanent magnets may be disposed on the rotor 28 and/or rotor shaft 26. A polymer-based fixation material may then be introduced to fix the magnetic structures 46, 52 to the rotor 28 and/or rotor shaft 26 to maintain the relative positions of the permanent magnets on the rotor 28 and/or rotor shaft 26. As illustrated, for example, in FIG. 3, the polymer-based fixation material may form a web 60 between the magnetic structures 46, 52. That polymer-based fixation material may likewise form a shell over the magnetic structures 46, 52, so long as the stationary position sensor 44 may sense the rotational component 42 in use.

Alternatively, the polymer-based fixation material itself may include polymer-bonded magnet material. Any magnetic material which can hold residual magnetization after the magnetizing field being removed may be utilized. Preferentially, the material utilized is a ferrite-based polymer bonded magnet although other materials are also feasible; by way of example only, Nd—Fe—B may be utilized. The molding process may be done in a single shot or multiple shots. If molded in a single shot, for example, the rotational component 42 may be formed of a polymer-based fixation material including polymer-bonded magnet material capable of magnetic polarization. The rotational component 42 molded to the rotor 28 and/or rotor shaft 26 may then be magnetized to desired strengths and polarities.

In yet another embodiment, a "neutral" polymer-based fixation material may be injected to form a web 60 of polymer-based fixation material (see FIG. 3) about the polymer-based fixation material including the polymer-bonded magnet material. Such a "neutral" polymer-based fixation material of the web 60 may be injected as a subsequent shot following one or more shots of polymer-based fixation material including a polymer-bonded magnet material, or the "neutral" polymer-based fixation material of the web 60 may be injected as a first shot, followed by subsequent shots of polymer-based fixation material including a polymer-bonded magnetic material.

It will further be appreciated that any sprue or sprues resulting from the molding of the molded polymeric section 50 or the molded polymeric section 50 itself may be adjusted to assist in balancing of the rotor assembly 25. For example, such polymer-based fixation material of the molded polymeric section 50 or the sprue(s) may be utilized to balance the rotor assembly 25 in a manner such as disclosed in U.S. application Ser. No. 15/848,649, which is incorporated herein by reference for all it discloses.

Turning now to the stationary position sensor 44, the stationary position sensor 44 may be coupled to the stator 22 at any appropriate position, so long as it is sufficiently proximal to the rotational component 42 of the monitoring system 40. For example, the stationary position sensor 44 may be supported from the drive end cap 14 or from the frame 12. As illustrated in FIG. 5, the stationary position sensor 44 may be supported by support 66 along the drive end cap 14 and disposed in a proximal position parallel to a rotational component 42 disposed along the end ring 31 of the rotor 28. By way of further example, the stationary position sensor 44 may be supported by support 68 from the drive end cap 14 and disposed proximal to the rotational component 42 along the rotor shaft 26, as illustrated in FIG. 6. Those of skill in the art will appreciate that the stationary position sensor 44 might alternatively or additionally be otherwise supported with the stator 22, such as directly from the frame 12 as illustrated in FIG. 4.

Those of skill in the art will appreciate that more than one stationary position sensor 44 may be provided. For example, in an embodiment wherein rotational components 42 are provided along either end of the rotor 28 or rotor shaft 26, a stationary position sensor 44 may likewise be provided at either end. Moreover, while FIGS. 4-6 each have been described with regard to the support of a single stationary position sensor 44, the illustrated arrangement may support more than one stationary position sensor 44. Further multiple supports may be provided. For example, each of the supports 66, 68 illustrated in FIGS. 5 and 6 may be included in a single embodiment, each supporting a respective stationary position sensor 44; such an arrangement may be utilized, for example, when second magnetic structures 46 are provided along both an end ring 31 of the rotor 28 and along the rotor shaft 26.

Some embodiments of the invention may simplify the construction of electric machines 10. The construction of a rotor 28 and rotor shaft 26 that includes a rotational component 42 that is integral with the rotor 28 or rotor shaft 26 may minimize the number of parts to be assembled and associated part inventories, as well as the labor involved in the assembly of such electric machines 10. As will be understood by those of skill in the art, some embodiments invention may reduce part count, mechanical complexity, and machine length by incorporating the rotational component 42 of the monitoring system 40 directly onto the rotor 28 or rotor shaft 26 of the electric machine 10. As a result, the disclosed arrangement may reduce the cost of manufacture and/or assembly of such electric machines 10. Some embodiments of the invention may likewise reduce scrap and reworking costs in the assembly process.

In some embodiments, the axial length of the electric machine may be reduced as a result of the incorporation of the rotational component 42 with the rotor assembly 25.

According to some embodiments, the second magnetic structures 46 and the polymer-based fixation material may be optimized to provide desired performance. Some embodiments may provide a higher resolution and accuracy. A large diameter of a rotor 28 may provide significant area for the inclusion of magnetic poles. In some embodiments, this may increase the resolution of the monitoring system 40.

In some embodiments, different lamination designs, different shapes, different numbers of poles and pole combinations, and/or different polymer-bonded magnet materials may be provided to yield a desired result, such as a desired flux density or the avoidance of unwanted interference.

While certain embodiments have been described in detail in the foregoing detailed description and illustrated in the accompanying drawings, those with ordinary skill in the art will appreciate that various modifications and alternatives to those details could be developed in light of the overall teachings of the disclosure. Particularly, the figures and exemplar embodiments of the rotor laminations are intended to show illustrative examples and not to be considered limiting in any sense. Accordingly, the particular arrangements disclosed are meant to be illustrative only and not limiting as to the scope of the invention which is to be given the full breadth of the appended claims and any and all equivalents thereof.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A rotor assembly for an electric machine, the rotor assembly comprising:
   a rotor shaft,
   a rotor secured with the rotor shaft, the rotor including first magnetic structures utilized for torque production in the electric machine, and
   second magnetic structures, the second magnetic structures including second magnetic poles not utilized for torque production in the electric machine, the second magnetic structures being polymer-bonded to the rotor shaft, the second magnetic structures extending axially along the rotor shaft with the second magnetic poles alternating around the rotor shaft.

2. The rotor assembly of claim 1 wherein the first magnetic structures include first magnetic poles, the second magnetic poles are different than the first magnetic poles.

3. The rotor assembly of claim 2 wherein the first magnetic structures include a first magnetic material and the second magnetic structures include a second magnetic material that is different than the first magnetic material.

4. The rotor assembly of claim 1 wherein the second magnetic structures are overmolded with a polymer-based fixation material.

5. The rotor assembly of claim 1 including a polymer-based fixation material including polymer-bonded magnet material, the polymer-bonded magnet material being magnetized to the second magnetic poles.

6. The rotor assembly of claim 1 wherein the second magnetic structures include at least of ferrite, Nd—Fe—B, or a material which can hold residual magnetization after a magnetizing field being removed.

7. A method of manufacturing a rotor assembly for an electric machine, the method comprising the steps of:
   providing a rotor and a rotor shaft,
   providing first magnetic structures on a peripheral surface of the rotor, said first magnetic structures including first magnetic poles and being adapted for torque production in the electric machine,
   placing the rotor shaft into a mold, and
   passing a polymer-based fixation material into the mold to polymerically bond second magnetic structures to the rotor shaft, the second magnetic structures including second magnetic poles not utilized for torque production in the electric machine;
   wherein the step of polymerically bonding includes orienting alternating second magnetic poles in an axial direction along the rotor shaft.

8. The method of claim 7 wherein the step of passing a polymer-based fixation material into the mold to polymerically bond second magnetic structures to the rotor shaft includes disposing a plurality of the second magnetic structures on the rotor shaft, and passing the polymer-based fixation material into the mold to polymerically bond the second magnetic structures to the rotor shaft.

9. The method of claim 8 wherein the step of passing a polymer-based fixation material into the mold includes overmolding the polymer-based fixation material around the second magnetic structures.

10. The method of claim 7 wherein the step of passing a polymer based fixation material into the mold to polymerically bond second magnetic structures to the rotor shaft includes passing a polymer-based fixation material including the second magnetic structures into the mold, and the method further includes magnetizing the second magnetic structures with the second magnetic poles.

11. The method of claim 10 wherein the step of magnetizing the second magnetic structures with the second magnetic poles is performed after the step of passing a polymer-based fixation material into the mold.

12. The method of claim 7 further including forming a sprue projecting from the rotor assembly and adjusting a weight of the sprue to rotationally balance the rotor about a rotor center axis.

13. A method of manufacturing a rotor assembly for an electric machine, the method comprising the steps of:
   providing a rotor and a rotor shaft,
   providing first magnetic structures on a peripheral surface of the rotor, said first magnetic structures including first magnetic poles and being adapted for torque production in the electric machine,
   placing at least one of the rotor and the rotor shaft into a mold, and
   passing a polymer-based fixation material into the mold forming a sprue projecting from the rotor assembly and polymerically bonding second magnetic structures to at least one of the rotor and the rotor shaft, the second magnetic structures including second magnetic poles not utilized for torque production in the electric machine, and
   adjusting a weight of the sprue to rotationally balance the rotor about a rotor center axis;
   wherein the polymer-based fixation material includes the second magnetic structures, and wherein the step of passing a polymer based fixation material into the mold forming a sprue and polymerically bonding second magnetic structures to at least one of the rotor and the rotor shaft includes passing a polymer-based fixation material including the second magnetic structures into the mold, and the method further includes magnetizing the second magnetic structures with the second magnetic poles.

14. The method of claim 13 wherein the step of passing a polymer based fixation material into the mold forming a sprue and polymerically bonding second magnetic structures to at least one of the rotor and the rotor shaft includes disposing a plurality of the second magnetic structures on at least one of the rotor and the rotor shaft, and passing the polymer-based fixation material into the mold to polymerically bond the second magnetic structures to the at least one of the rotor and the rotor shaft.

15. The method of claim 14 wherein the step of passing a polymer-based fixation material into the mold includes overmolding the polymer-based fixation material around the second magnetic structures.

16. The method of claim 13, wherein the step of magnetizing the second magnetic structures with the second magnetic poles is performed after the step of passing a polymer-based fixation material into the mold.

17. The method of claim 13 wherein the step of polymerically bonding includes orienting alternating second magnetic poles in a radial direction along an end ring of the rotor.

18. The method of claim 13 wherein the step of polymerically bonding includes orienting alternating second magnetic poles in an axial direction along the rotor shaft.

* * * * *